United States Patent [19]

Babel

[11] Patent Number: 5,417,038
[45] Date of Patent: May 23, 1995

[54] METHOD AND DEVICE FOR PACKAGING COMPRESSIBLE INSULATING PRODUCTS

[75] Inventor: Patrice Babel, Corpeau, France

[73] Assignee: Isover Saint-Gobain, Courbevoie, France

[21] Appl. No.: 133,317

[22] Filed: Oct. 8, 1993

[30] Foreign Application Priority Data

Oct. 8, 1992 [FR] France .................. 92 11943

[51] Int. Cl.6 ............................ B65B 35/50
[52] U.S. Cl. ..................... 53/447; 53/399; 53/449
[58] Field of Search .................. 414/789.2, 789.3; 53/399, 447, 212, 540, 587, 588, 441, 443, 436, 438, 448, 449

[56] References Cited

U.S. PATENT DOCUMENTS

| | | | |
|---|---|---|---|
| 2,985,323 | 5/1961 | Wilson et al. | 414/789.2 |
| 3,771,671 | 11/1973 | Cathers | 414/789.2 |
| 4,019,639 | 4/1977 | Stobb . | |
| 4,124,127 | 11/1978 | Vevang | 414/789.2 |
| 4,535,587 | 8/1985 | Rias | 53/447 X |
| 4,610,592 | 9/1986 | Pienta | 414/789.2 |
| 4,619,570 | 10/1986 | Siebenga | 414/789.3 |
| 4,708,583 | 11/1987 | Moen | 414/789.3 X |
| 4,821,491 | 4/1989 | Rias | 53/399 X |
| 4,852,331 | 8/1989 | Bogh | 53/399 |
| 4,925,120 | 5/1990 | Meier | 414/789.2 X |
| 5,048,261 | 9/1991 | Lancaster et al. | 53/587 X |

FOREIGN PATENT DOCUMENTS

| | | | |
|---|---|---|---|
| 3631406 | 3/1988 | Germany | 414/789.2 |
| 8502816 | 1/1986 | Netherlands . | |
| 985040 | 3/1965 | United Kingdom | 414/789.3 |

*Primary Examiner*—John Sipos
*Assistant Examiner*—Daniel Moon
*Attorney, Agent, or Firm*—Oblon, Spivak, McClelland, Maier, & Neustadt

[57] ABSTRACT

A load of compressible, fibrous insulating mats can be unified in the form of a roll or substantially parallelepiped set of panels by disposing a pallet vertically on a vertically oriented support, laying a layer of horizontally oriented products on a horizontal portion of the support such that they abut the vertical pallet, and stacking at least another layer of the products on the first layer to form a load. The resulting load is rotated by 90° so as to bring the pallet into a horizontal position, after which the load is assembled with a wrapping film and covered with a cover.

10 Claims, 2 Drawing Sheets

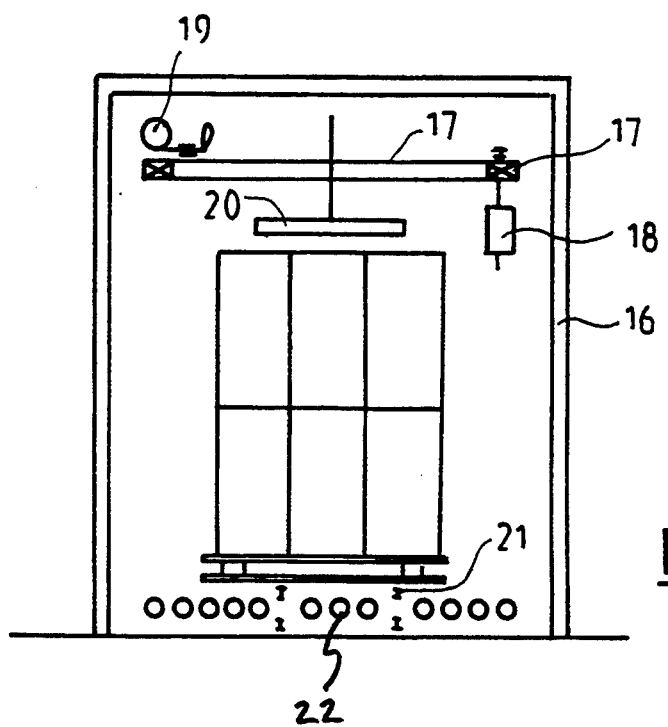
FIG_6
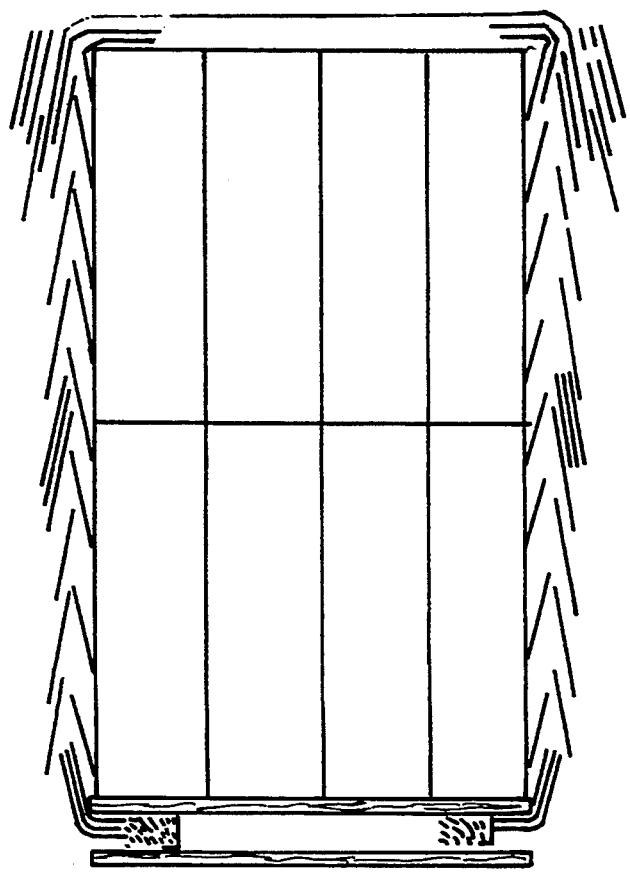
FIG_7

METHOD AND DEVICE FOR PACKAGING COMPRESSIBLE INSULATING PRODUCTS

BACKGROUND OF THE INVENTION

1. Field of the Invention

The present invention relates to packaging of compressible insulating products, in particular for the purpose of transporting or storing them. More specifically, the invention relates to a method for producing a load of fibrous insulating products in a unitary condition in the form of a roll or of a substantially parallelepiped set of panels, the products in the unitary condition preferably being covered with a protective envelope, made for example of kraft paper or a film of plastic material.

2. Description of the Related Art

Fibrous insulating products are very voluminous products which have a relatively low mass, with densities of approximately 15 kg/m$^3$, for example, being common. The relative cost of transporting and storing these products is thus high. Additionally, mineral wool can absorb considerable quantities of water, and the products must therefore not be exposed to rain or other bad weather conditions. It is known for these products to be maintained in a unitary condition in an envelope, which is also used to maintain the product in the rolled condition, or to assemble a series of several panels into a set. However the envelope generally does not cover all of the outer surface of the product, and is therefore insufficient for providing full protection against bad weather conditions. Furthermore, in order to simplify loading and unloading operations, these products are preferably palletized, i.e. packaged in loads of approximately ten, or a few tens of units, the load being positioned on a pallet, in order to facilitate handling thereof. The load is provided with a sheath or any other equivalent means compatible with transport on vehicles not covered with a tarpaulin, and without outdoor storage.

A load of this type is known from French patent FR-79.17771, and uses shaped boards and ties at right angles to one another supported on these boards, the former acting as straps, and the latter comprising supports. The assembly is finally protected by a sheath. Additionally, it is known from European patent EP-B-72 302 to stack insulating packages, the stack delimited by rigid flat components, and subjected to a series of compressions. The stacks are then assembled according to groups by means of cases or of enveloping structures using boards, beams and other hooping means, which form a type of case. As in the previous case, the assembly is protected by a sheath. In both these patents, the load is obtained by using a series of structural components such as boards, stiffeners, cases, etc., each of which constitutes waste to be destroyed during the unpackaging process, and which obviously increases the cost of packaging the products.

This disadvantage is eliminated in the method known according to European patent EP-B-220 980, consisting of the formation of a series of modules, formed by stacking a given number of products, compression in the direction of stacking, and assembly of these products via a film which forms a sealed band due to self adhesion or welding, then superimposition of these modules, two modules being in contact along their parallel surfaces in the direction of the compression exerted during production of the modules. The stacks of modules thus constituted are preferably assembled by means of a film wrapped about the stack. The subdivision of the load into a series of modules is especially advantageous during the unpackaging operations, but requires an installation station reserved specifically for the formation of these modules. Moreover, the cost of the bands increases that of the packaging.

It must be emphasized that although all the solutions known according to the prior art appear to be relatively complex, this is because it is always necessary to take the greatest possible care, bearing in mind the relatively fragile nature of fibrous insulating products, and in particular to prevent the packaging from causing permanent deformations which would, for example, adversely affect the capacity for recovering the initial volume during unpackaging, since the unit products, and in particular the rolls, are already highly compressed.

SUMMARY OF THE INVENTION

It is an object of the present invention to provide a simplified method for packaging fibrous insulating products, enabling loads to be obtained which can be stored and transported without special protection, at a relatively low cost, and eliminating as far as possible all the "disposable" structural components of the load, i.e. all the components which the user must dispose of when unpackaging takes place.

This problem is solved according to the invention by a method comprising successive stages in which a pallet is disposed vertically; a first layer of products is laid flat, facing horizontally and placed adjacent one another, in contact with another, and abutting the vertical pallet; at least a second layer of products is stacked on the first layer; the load is rotated by 90° so as to bring the pallet into a horizontal position; a cover is disposed on top of the load; and the load-is unified by means of a film wrapped about its periphery.

In order to implement the invention, rolls can be laid with their flat, or at least substantially flat, ends abutting the pallet, such that in the final load position they will be upright with their longitudinal axes facing vertically. The invention also applies to sets or batches of several panels, previously assembled for example by means of a heat-shrink film, which batches have a substantially parallelepiped form and whose volume is approximately that of the rolls. Hereinafter, reference will be made almost exclusively to rolls, but it should be understood that the invention is not limited to this specific case. These rolls or sets of panels are preferably covered with a unitary envelope, for example based on kraft paper or plastic material, but this envelope is not necessarily fully leak-tight, or even essential, since the rolls can be maintained in the rolled condition by, for example, means of bands, although this solution is naturally not preferable.

The invention requires installations which in practice are very inexpensive, with the exception of the wrapping station. Thus for example, a simple stand can be used, consisting of a trolley which supports two plates mounted at right angles about a rotational shaft, and which can thus pivot simultaneously by a quarter turn, the first plate acting as a support for the vertical pallet, and the second plate acting as a temporary support for the rolls during formation of the stacks.

The operations of depositing the pallet and stacking can thus easily be performed by a single person or by a robot. In the case of a non-robotized installation, it should be noted that the loads to be handled are relatively light, and similarly the height of the stack remains low (with rolls already 60 cm wide, the third and usually the final layer must be deposited at a height of only 1.20 m).

If necessary, the load can be rotated by 90 without being laterally supported, i.e., supported at the sides thereof. In this case, during any operations of transport from the loading station where the rolls are stacked to the wrapping station, the pallet is maintained slightly inclined relative to the horizontal, in order to prevent the rolls from falling. Nevertheless, it is preferable to provide means for supporting the load laterally, which operate when the load is rotated. These means consist for example of low vertical side elements, which are drawn towards one another in order to clamp the stack immediately before and during rotation. These low side elements are preferably present during the assembly of the stack, although they are then preferably kept tapered slightly apart toward their upper portion, such that the rolls are disposed in a position delimited by four sides, and their positioning is thus simplified.

According to a preferred embodiment of the invention, the final load produced comprises at least two, and preferably exactly two levels of rolls. For this purpose, the operation is always carried out under flat conditions, i.e. after the rolls of the first stack have been disposed on the stand, a second stack is constituted which abuts the first stack, and the assembly of these two juxtaposed stacks is rotated. In order to assist handling and prevent the operator from having to climb up onto the stand, it is advantageous to use a stand or support of which the part of the plate destined to receive the second adjacent stack can be retracted under the part which acts as a support for the first stack, and is used by the operator when he progresses to the second part of his loading operation.

The method according to the invention permits production of loads of for example 24 rolls, i.e., two levels of 4×3 rolls obtained by disposing two stacks, each of which has three layers of rolls which for example are 1.20 m long and 60 cm in diameter. No structural component other than the wrapping film and the pallet is in the final load, a few additional turns of the film simply being provided at the critical points, for example at the joint between the two levels of the load, at the pallet, and at the cover.

BRIEF DESCRIPTION OF THE DRAWINGS

Other details and advantageous features of the invention will be become apparent from the following description, with reference to the attached drawings, which represent:

FIG. 6 is a schematic side view of a wrapping station; and

FIG. 7 is a lateral view of a load obtained after wrapping.

DETAILED DESCRIPTION OF THE PREFERRED EMBODIMENT

The packaging station according to the invention is preferably installed at the end of one or a plurality of lines for producing insulating products, shortly after the latter have been packaged in a unit by means of a winding machine (products are held in bands, for example by means of a paper strip, a tubular sheath, or a heat-shrink film), or by a stacking machine (in the case of sets of panels).

Figure 1:
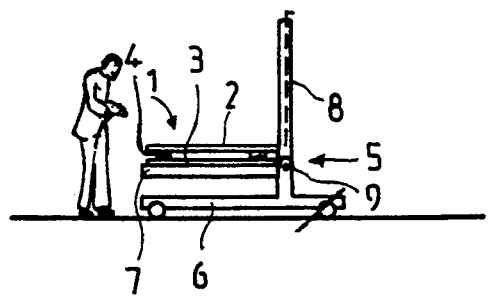
FIGS. 1-5 illustrates various stages of the packaging method according to the invention.

The first operation, shown schematically in FIG. 1, consists of putting the pallet into position. This pallet 1 preferably consists of two wooden boards 2, 3 or duckboards spaced by crosspieces 4 which form sufficient space for the introduction of forks of the handling device, the lower board 3 permitting ease of movement on a runway and of stacking of the loads. To the base of the pallet there is hooked or attached by any other equivalent means a cover made of a film of plastics material, for example a 50 micron polyethylene film, perforated regularly for the discharge of condensation. The pallet 1 is placed on a stand 5 consisting of a trolley 6 and of two support plates 7 and 8, mounted at right angles about a rotational shaft 9. The plate 7 is preferably provided with lugs which can be engaged on the side of the pallet, and thus lock it in position in order to prevent it from falling when it is pivoted by a quarter turn in order to place it in the vertical position.

Figure 2:
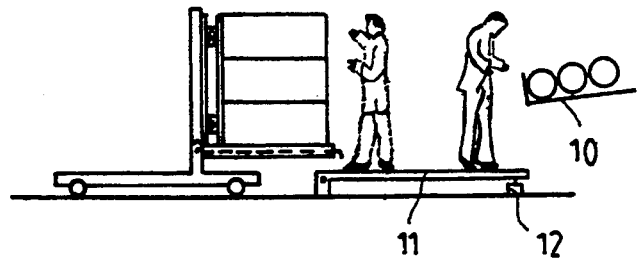

The pallet attached to the plate 7 is placed in the vertical position by rotating the stand. In this position shown in FIG. 2, the loading can begin. The operator retrieves the rolls from the accumulation table 10 and places them on the plate 8. The rolls are placed with there longitudinal axes extending horizontally. There is preferably provided a loading platform 11 equipped with a detector 12 for sensing the presence of the operator which prevents the stand from moving during loading.

However, before loading begins, low lateral side elements 15 are put into position, for example by being attached to the plate 8. The rolls will thus be placed in a type of low case which is open only at the top and the front. Preferably, the space between the side elements initially increases from base to top, thus preventing the rolls in a single layer from overlapping.

The operator will then place layers of rolls in succession, laid with their longitudinal axes perpendicular to the pallet. Each layer can typically comprise 3 rolls, as in the case shown, or 4 rolls.

Taking into consideration the common dimensions of transport vehicles, and more specifically those of railway wagons, the number of layers is normally limited similarly to 3 or 4. However, as for the number of rolls per layer, this does not involve a technological limit, but is simply a result prescribed by the need to occupy the space available in the most efficient possible way, and to produce loads of a volume and weight compatible with the most common handling devices.

Figure 4:
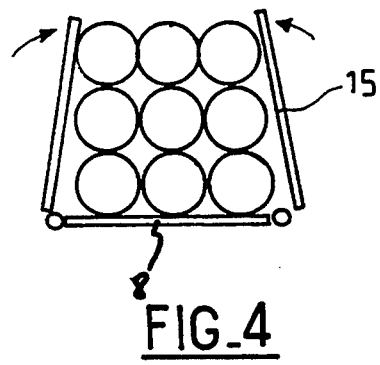
Figure 3:
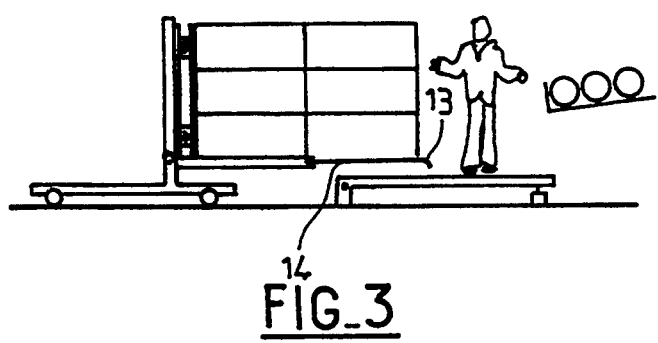

When a first stack of, for example 4×3 rolls has been formed, the operator extends the plate 14 by means of the handle 13. The plate 14 consists of a metal plate retracted beneath the plate 8. The operator can then form a second stack which abuts the first (FIG. 3) by stacking on plate 14. The lateral side elements 15 of the stand are then drawn together as shown in FIG. 4, and the rolls are aligned vertically.

Figure 5:
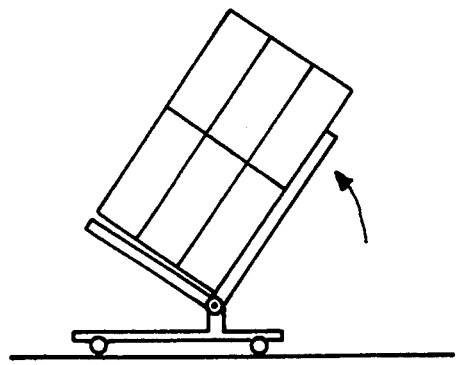

In this position, the load can be pivoted about shaft 9 (FIG. 5), preferably simultaneously with transfer of the stand towards the wrapping station. After this pivoting, the stand has thus regained its initial position, and the rolls are then upright, positioned on the pallet.

The wrapping station shown in FIG. 6 is preferably placed in a cage 16. It comprises, for example, a so-called fixed load machine consisting substantially of a ring 17 which supports a carriage, and which sets in motion a system 19 (numbered 18 in its alternative position) for unwinding and drawing a film 1. This ring also supports the system for putting into position a cover film, and a system for cutting the cover film unrolled from the bobbin 19. The ring 17 is driven for vertical movement controlled by rotation of the carriage. Associated with this ring 17 is a stabilizer plate 20 which serves the double purpose of maintaining the rolls in position throughout the wrapping operation and assisting in correct positioning of the cover. Additionally, the wrapping station comprises a pallet lift 21 which lifts the pallet, thereby releasing it from the stand, and supporting it in a high position during wrapping. Preferably, the wrapping station is positioned above a roller conveyor 22, in order to enable the wrapped loads to be discharged. The pallet lifting system is accommodated beneath this conveyor when it is in the low position.

The wrapping operations take place as follows: as soon as the load is in position in the wrapping station, the pallet lift goes into action and releases the retention lugs. The stabilizer plate 20, whose force preferably derives from its own weight, is then lowered in order to lock the load, and the wrapping begins from the base of the pallet, with a few circumferential turns which retain the pallet on the load.

The wrapping film is obtained by use of a motorized prestretching machine, and with a mechanical elongation of the film, which for example is made of polyethylene. The stretching is accomplished by passage of the film onto two rollers whose circumferential speed differs according to the ratio of the diameters of the rolls, and of the ratio of that of the pinions on the shafts of these rolls. After this prestretching stage, the film tension is controlled by passing the film onto an idle roller attached to two articulated arms driven by two jacks, of which the position on the articulated arms can be altered in order to extend or retract the position of the lever arms.

At the start, the end of the film is preferably maintained by a gripper of the pallet, which gripper releases the film at the end of the first turn. The film used can be a so-called stretch polyethylene film 20 to 30 microns thick, with a stretching capacity greater than 400%. Starting from near the pallet, the ring is gradually raised as the carriage circles the load, but is momentarily kept stationary at the connection between the two levels of the load. As the top of the load is approached, the stabilizer plate is withdrawn, which is possible since the load is self-stabilized by the film already in position.

A length of cover film is then unwound from bobbin 19, to the required length above the load, the plate is lowered, and the cover is cut, preferably by a mechanical blade. For the cover, there is preferably used a relatively thick polyethylene film, which is anti-uv treated, and at least 75 microns thick, for example 100 microns thick. The wrapping with the cover then continues downwards, preferably with the same rate of covering between each turn as for the first turns (i.e. for example 50%), and the cover is wrapped by several turns of the wrapping film. Finally the polyethylene wrapping film is welded to itself and cut.

It is also possible to perform an equivalent cycle starting from the top of the load, and then carrying out the following stages:
N turns at the top;
descent in a spiral with x % of covering;
N1 turns at the bottom in order to incorporate the pallet;
rising in a spiral with x 1% covering;
N2 turns in the middle to hold the layers of rolls together;
rising in a spiral with x1% covering to the top of the pallet;
raising of the plate;
unwinding of the cover;
descent of ring (bobbin, stretch film+cover+presser plate);
cutting of cover;
1 turn wrapping of cover by the stretch film;
rising in a spiral to the top of the pallet;
N3 turns at the top for wrapping the cover;
welding-cutting of stretch film.

The numbers N1, N2 and N3 of turns, and the percentage of covering are adjusted according to the circumstances.

The invention thus enables loads of stackable rolls or panels to be produced very simply, since the pallets do not have a foot, and the top of the load is covered by a fairly thick film, and is thus highly moisture resistant. Additionally, these loads can be stored outdoors, without any additional precautions, without deterioration of the quality of the insulation products, and in particular without any problems of recovery of thickness.

Obviously numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Method for producing a load of compressible fibrous insulating products in a unified condition, said load being in the form of a rolls, comprising the steps of:
disposing a pallet substantially vertically;
laying flat a first layer of rolls having substantially horizontally oriented longitudinal axes, placed adjacent one another, in contact with one another on a support and abutting the vertical pallet;
stacking at least a second layer of rolls on the first layer to form a first stack; forming a second stack which abuts the first stack and forms an axial extension of the first stack, wherein the two stacks define a load.
rotating the pallet and load by 90° so as to bring the pallet into a horizontal position and bring the axes of the rolls into a substantially vertical position;
disposing a cover over the rotated load; and
unifying the covered load by wrapping film about the periphery of the load.

2. Method according to claim 1, including the step of supporting the load laterally during said rotating step.

3. Method according to claim 2, wherein said lateral supporting step comprises placing side elements on the support before the rolls are disposed thereon, and drawing together the side elements.

4. Method according to claim 1 wherein the cover consists of a polyethylene film more than 75 microns thick.

5. Method according to claim 1 wherein the wrapping film is a polyethylene film 20 to 30 microns thick, with a mechanical stretching capacity greater than 400%.

6. Method for producing a load of compressible fibrous insulating products in a unified condition, said load being in the form of a substantially parallelepiped set of panels, comprising the steps of:
disposing a pallet substantially vertically;

lying flat a first layer of panels such that the major length of the panels is oriented substantially horizontally, placed adjacent one another, in contact with one another on a support and abutting the vertical pallet;

stacking at least a second layer of panels on the first layer to form a first stack; forming a second stack which abuts the first stack and forms an axial extension of the first stack, wherein the two stacks define a load.

rotating the pallet and load by 90° so as to bring the pallet into a horizontal position and bring the major lengths of the panels into a substantially vertical position;

disposing a cover over the rotated load; and unifying the covered load by wrapping film about the periphery of the load.

7. Method according to claim 6, including the step of supporting the load laterally during said rotating step.

8. Method according to claim 7, wherein said lateral supporting step comprises placing side elements on the support before the products are disposed thereon, and drawing together the side elements.

9. Method according to claim 6 wherein the cover consists of a polyethylene film more than 75 microns thick.

10. Method according to claim 6 wherein the wrapping film is a polyethylene film 20 to 30 microns thick, with a mechanical stretching capacity greater than 400%.

* * * * *